(12) United States Patent
Cho et al.

(10) Patent No.: US 7,976,910 B2
(45) Date of Patent: Jul. 12, 2011

(54) LIQUID CRYSTALS AND LIQUID CRYSTAL DISPLAY APPARATUS EMPLOYING THE SAME

(75) Inventors: Seon-Ah Cho, Busan (KR); Jang-Hyun Kim, Seoul (KR); Seong-Nam Lee, Seoul (KR); Jeong-Uk Heo, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 89 days.

(21) Appl. No.: 12/346,218

(22) Filed: Dec. 30, 2008

(65) Prior Publication Data

US 2010/0165223 A1 Jul. 1, 2010

(51) Int. Cl.
*C09K 19/30* (2006.01)
*C09K 19/12* (2006.01)
*G02F 1/1343* (2006.01)

(52) U.S. Cl. .............. 428/1.1; 252/299.63; 252/299.66; 349/33

(58) Field of Classification Search .................. 428/1.1; 252/299.63, 299.66; 349/33
See application file for complete search history.

(56) References Cited

U.S. PATENT DOCUMENTS

| | | | |
|---|---|---|---|
| 7,351,453 B2* | 4/2008 | Ichinose et al. | 428/1.1 |
| 7,670,504 B2* | 3/2010 | Kawakami et al. | 252/299.01 |
| 2006/0115606 A1* | 6/2006 | Ichinose et al. | 428/1.1 |
| 2008/0111107 A1* | 5/2008 | Kawakami et al. | 252/299.63 |
| 2009/0103042 A1* | 4/2009 | Fujita et al. | 349/182 |

FOREIGN PATENT DOCUMENTS

| | | |
|---|---|---|
| JP | 2004-035698 | 2/2004 |
| JP | 2006-282544 | 10/2006 |
| KR | 10-2007-0087601 | 8/2007 |
| WO | WO 2007083561 A1 * | 7/2007 |

* cited by examiner

*Primary Examiner* — Shean C Wu
(74) *Attorney, Agent, or Firm* — Cantor Colburn LLP

(57) ABSTRACT

A liquid crystal includes about 50 wt % to about 65 wt % of a negative compound material, and about 40 wt % to about 50 wt % of a neutral compound material. A liquid crystal display apparatus comprises a first substrate having a pixel area, a second substrate facing the first substrate, and a plurality of liquid crystals disposed between the first substrate and the second substrate, wherein each liquid crystal comprises about 50 wt % to about 65 wt % of a negative compound material having a dielectric anisotropy of a negative polarity, and about 40 wt % to about 50 wt % of a neutral compound material.

14 Claims, 8 Drawing Sheets

LIQUID CRYSTALS AND LIQUID CRYSTAL DISPLAY APPARATUS EMPLOYING THE SAME

BACKGROUND OF THE INVENTION

1. Field of the Invention

The present invention relates to display apparatus and, more particularly, to liquid crystals and a liquid crystal display apparatus employing the liquid crystals.

2. Discussion of the Background

A liquid crystal display (LCD) apparatus displays images using liquid crystals. The LCD apparatus includes first and second substrates facing each other with a liquid crystal layer therebetween. Further, first and second electrodes are disposed on the first and second substrates, respectively, and the liquid crystal layer is disposed between the first and second electrodes. Thus, when a voltage is applied to the first and second electrodes, the voltage generates an electric field that crosses the liquid crystal layer.

The liquid crystal layer includes liquid crystals, and the liquid crystals in the liquid crystal layer are aligned along a specific direction by the electric field. That is, the alignment direction of the liquid crystals is determined by the electric field. In this case, the transmittance of light penetrating the liquid crystal layer depends on the alignment of the liquid crystals. The LCD apparatus controls the alignment of the liquid crystals using a material property of the liquid crystal layer and displays visual images corresponding to the transmittance of the light.

The liquid crystal layer includes various compound materials, and the properties of the liquid crystal layer may change according to characteristics of each compound material. Further, the properties of the liquid crystal layer influence the overall operation of the LCD apparatus. For example, the first and second electrodes and the liquid crystal layer therebetween constitute a capacitor, and the capacitance of the capacitor depends on a dielectric constant of the liquid crystal layer. In this case, when the capacitance of the capacitor varies, the operational characteristics of the LCD apparatus may also change.

SUMMARY OF THE INVENTION

The present invention are provides a liquid crystal and a liquid crystal display apparatus employing the same.

Additional features of the invention will be set forth in the description which follows, and in part will be apparent from the description or may be learned by practice of the invention.

The present invention discloses a liquid crystal including about 50 wt % to about 65 wt % of a negative compound material having a dielectric anisotropy of a negative polarity, and about 40 wt % to about 50 wt % of a neutral compound material.

The liquid crystal may further comprise a positive compound material is about 2 wt % to about 15 wt %.

The present invention also discloses a liquid crystal display apparatus including a first substrate having a pixel area and a second substrate facing the first substrate. A plurality of liquid crystals is disposed between the first and second substrates. Each liquid crystal includes about 50 wt % to about 65 wt % of a negative compound material having a dielectric anisotropy of a negative polarity, and about 40 wt % to about 50 wt % of a neutral compound material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
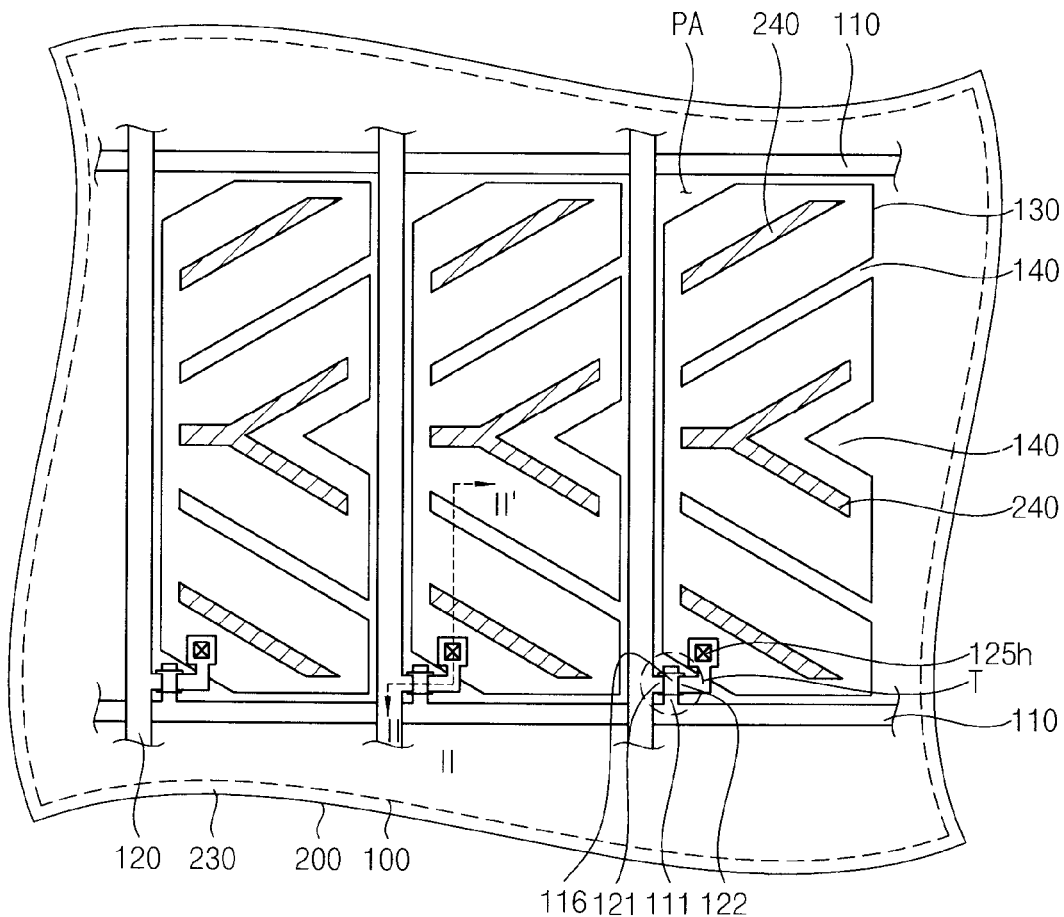
FIG. 1 is a plan view showing a liquid crystal display apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a plan view showing an LCD apparatus according to still an exemplary embodiment of the present invention.

Referring to FIG. 1, first and second substrates 100 and 200 are provided to face each other. Gate lines 110 and data lines 120 are disposed on the first substrate 100, and pixel areas PA are respectively defined at crossings of the gate lines 110 and the data lines 120. Each pixel area PA may include a first thin film transistor Ta, a second thin film transistor Tb, and a pixel electrode 130. Each data line 120 may include first and second data lines 120a and 120b, and the pixel area PA may be disposed between the first and second data lines 120a and 120b. The pixel electrode 130 may include a first pixel electrode 130a and a second pixel electrode 130b.

The first thin film transistor Ta may include a gate electrode 111, a first source electrode 121a, and a first drain electrode 122a. The first drain electrode 122a may be connected to the first pixel electrode 130a through a first contact hole 126h. The second thin film transistor Tb may include the gate electrode 111, a second source electrode 121b and a second drain electrode 122b. The second drain electrode 122b may be connected to the second pixel electrode 130b through a second contact hole 127h.

The first pixel electrode 130a may include a first sub pixel electrode 131, a second sub pixel electrode 132, and a third sub pixel electrode 133. The first and second sub pixel electrodes 131 and 132 may face each other, and the third sub pixel electrode 133 connects the first sub pixel electrode 131 with the second sub pixel electrode 132. The second pixel electrode 130b may be disposed between the first and second sub pixel electrodes 131 and 132.

The third sub pixel electrode 133 may be spaced apart from the gate line 110 and parallel to the gate line 110. The first sub pixel electrode 131 may overlap the first data line 120a, and the second sub pixel electrode 132 may overlap the second data line 120b. In this case, the pixel electrode 130 may occupy almost all of the pixel area PA since the pixel electrode 130 overlaps with the data line 120. This may increase the aperture ratio of the LCD apparatus. In another exemplary embodiment, the gate line 110 may also overlap an edge of the first pixel electrode 130a.

The first pixel electrode 130a may have a planar area that is greater than that of the second pixel electrode 130b. For example, the planar area of the first pixel electrode 130a may be twice that of the second pixel electrode 130b. A first data voltage and a second data voltage may be applied to the first and second pixel electrodes 130a and 130b, respectively. The first and second data voltages may be different from each other.

When a data signal is transmitted through the data line 120, a different voltage from the second data voltage may be applied to the second pixel electrode 130b. This may be due to a coupling capacitance between the data line 120 and the second pixel electrode 130b having a smaller area than the first pixel electrode 130a. Accordingly, in order to prevent the different voltage from the second data voltage from being applied to the second pixel electrode 130b, the first pixel electrode 130a may be disposed to overlap the data line 120. In this case, the first pixel electrode 130a may act as a shield electrode.

The pixel electrode 130 and the common electrode 230 may include a first domain divider 140 and a second domain divider 240, respectively. The first domain divider 140 may correspond to an opening formed through a portion of the pixel electrode 130. The opening may divide the pixel electrode 130 into first and second pixel electrodes 130a and 130b, which are spaced apart from each other. The second domain divider 240 may include one or more protrusions attached to a bottom surface of the common electrode 230 or an opening that penetrates the common electrode 230. The viewing angle of the LCD apparatus may be enhanced because of the presence of the first and second domain dividers 140 and 240.

Figure 2A:
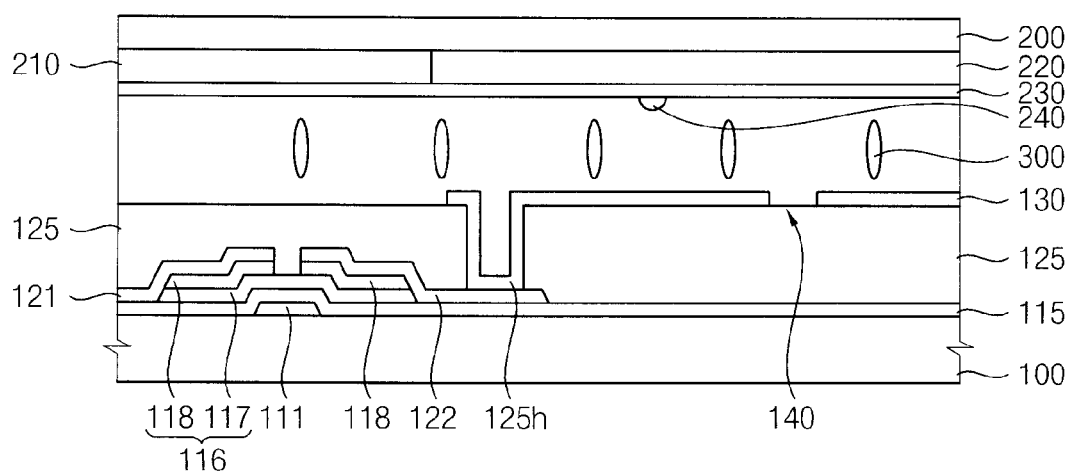
FIGS. 2A and 2B are cross sectional views taken along line III-III' of FIG. 1 to show the operation of the liquid crystal display apparatus shown in FIG. 1.
Figure 2B:
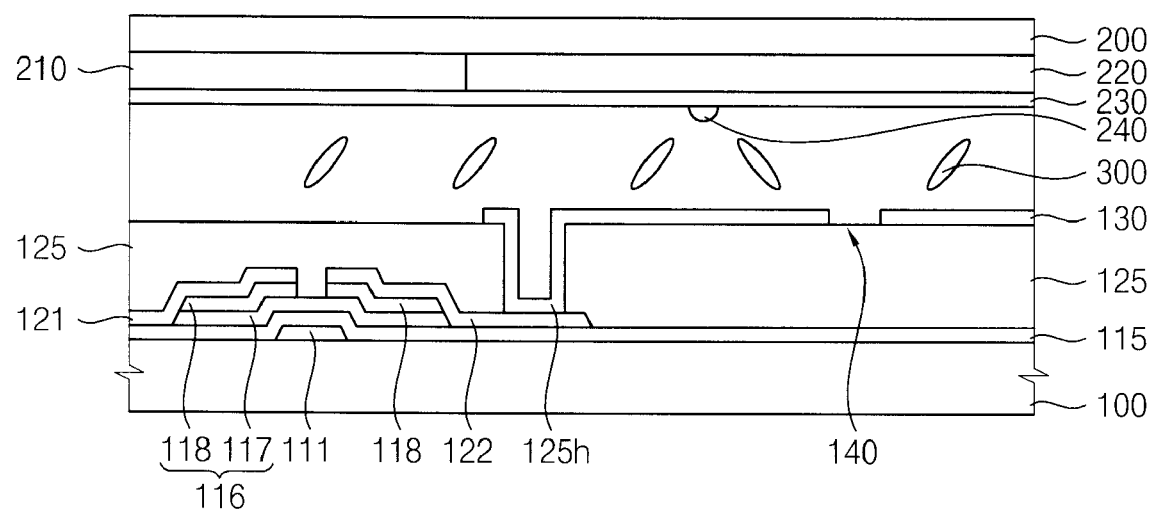

FIG. 2A and FIG. 2B are cross sectional views taken along line III-III' of FIG. 1 to show the operation of the LCD apparatus shown in FIG. 1.

Referring to FIG. 1 and FIG. 2A, a gate insulating layer 115 and a protection layer 125 may be sequentially stacked on a surface of the first substrate 100, which faces the second substrate 200. The first pixel electrode 130a and the second pixel electrode 130b may be disposed on the protection layer 125, and the first and second pixel electrodes 130a and 130b may be spaced apart from each other. A liquid crystal layer including the liquid crystals 300 may be disposed between the pixel electrode 130 and the common electrode 230, and the liquid crystals 300 may have negative dielectric anisotropy. Thus, the liquid crystals 300 may be arranged perpendicular to the pixel electrode 130 and the common electrode 230 when the first and second thin film transistors Ta and Tb are turned off. As a result, the corresponding pixel area PA of the LCD apparatus may generate a black color.

Referring to FIG. 1 and FIG. 2B, when the first and second thin film transistors Ta and Tb are turned on, first and second data voltages may be applied to the first and second pixel electrodes 130a and 130b, respectively. Further, a common voltage may be applied to the common electrode 230 while the first and second thin film transistors Ta and Tb are turned on. In this case, an electric field may be generated across the liquid crystal layer, and the liquid crystals 300 may be arranged to have a tilt with respect to the pixel electrode 130 and the common electrode 230. The electric field between the first pixel electrode 130a and the common electrode 230 may be different from that between the second pixel electrode 130b and the common electrode 230. This may be due to the presence of the first domain divider 140 between the first and second pixel electrodes 130a and 130b. Thus, the alignment direction of the tilted liquid crystals 300 on the first pixel electrode 130a may be different from that of the tilted liquid crystals 300 on the second pixel electrode 130b. In this case, the light transmitted through the tilted liquid crystals 300 on the first pixel electrode 130a may compensate the light transmitted through the tilted liquid crystals 300 on the second pixel electrode 130b, thereby improving the operation characteristics of the LCD apparatus.

When the LCD panels are used to display video signals, the image quality is inferior to a CRT. Although the contrast ratio for static images on the LCD panels can exceeds 500:1, for moving images degradation in the dynamic contrast ratio is seen and the edges of moving objects blur. The moving image characteristic is generally classified into two categories, that is, a moving image blurring phenomenon and a ghost phenomenon.

The moving image blurring is due to a dynamic texture and a rise response time of the liquid crystal. The ghost brighter than a target luminance at the next frame for changing black to gray luminance, is due to a fall response time of the liquid crystal at the present frame.

One method to improve video performance is increasing the frame rate to, for example, 120 Hz. Therefore, the liquid crystal display apparatus according to the preferred embodiment of the present invention may operate at a high frame frequency, for example, 120 Hz or 240 Hz. When the LCD apparatus operates at the frame frequency of 60 Hz, a data voltage holding time for an image of a single frame may be about 0.0167 ($\frac{1}{60}$) seconds. In contrast, when the LCD apparatus operates at the frame frequency of 120 Hz, the data voltage holding time for an image of a single frame may be about 0.0083 ($\frac{1}{120}$) seconds.

To eliminate the moving image blurring, it is necessary to reduce the rise response time of the liquid crystal which is expressed as follows.

$$\tau_{on} \propto \frac{\gamma_1 d^2}{(\varepsilon_0 \Delta\varepsilon_{LC} V^2 - \pi^2 K_{\mathit{eff}})}$$

where $\tau_{on}$ is the rise response time, d is the cell gap, $\gamma_1$ is the rotational viscosity of the liquid crystal, V is the applied voltage, $\Delta\varepsilon_{LC}$ is the dielectric anisotropy of the liquid crystal and $K_{\mathit{eff}}$ is the effective elastic constant respectively.

To reduce the rise response time, the dielectric anisotropy or the applied voltage should be increased, or the cell gap, the effective elastic constant or the rotational viscosity decreased.

When the LCD apparatus operates at the frame frequency of 120 Hz, the moving image blurring is reduced by adopting a DCC (Dynamic Capacitance Compensation) technology which is applying pixel electrode to a voltage larger than the exact gray voltage to compensate a kick back voltage and reduce the rise and fall response time.

Figure 3:
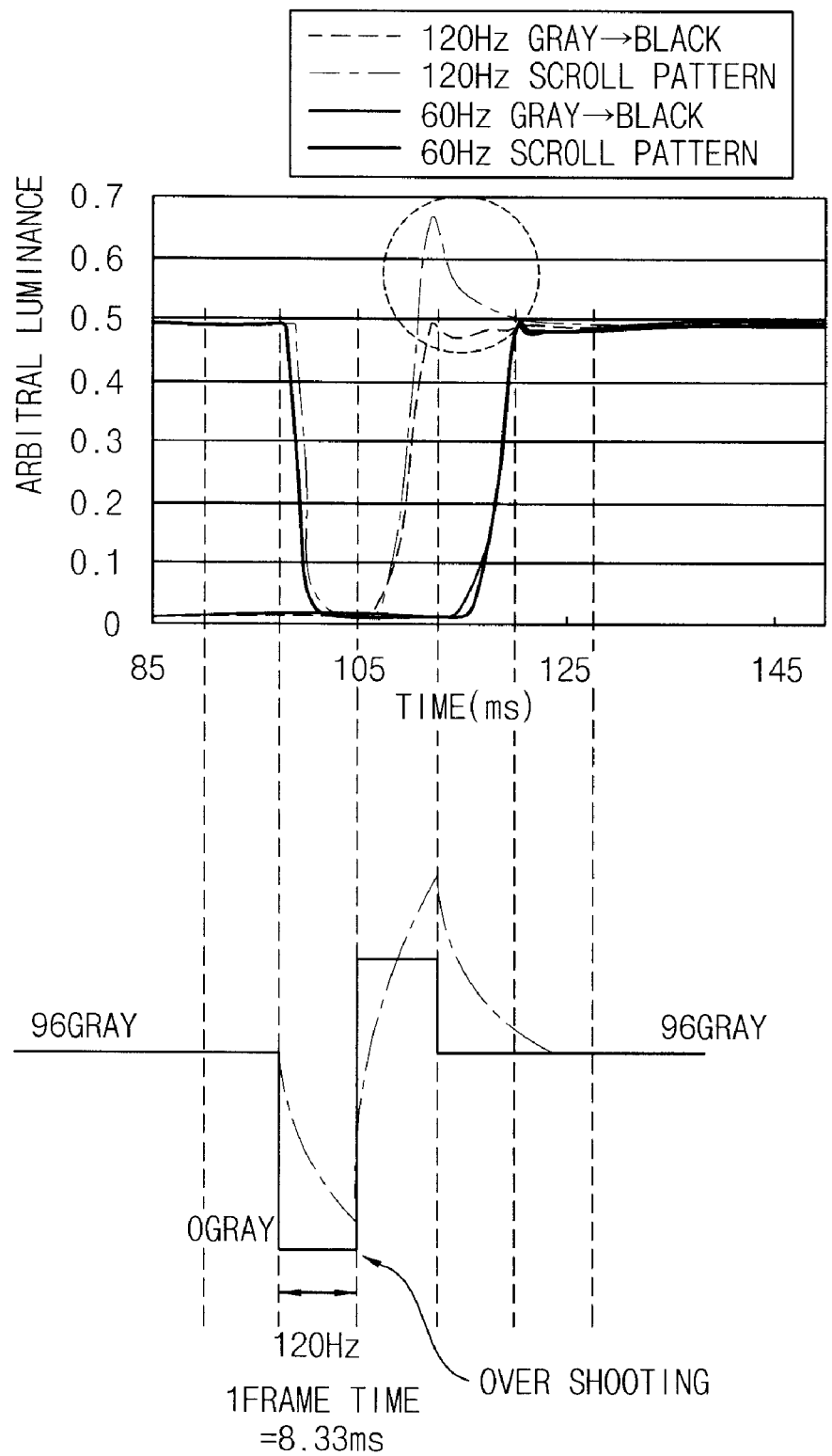
FIG. 3 is a time chart showing an optical response time of display luminance between gray levels responding to a data signal impulse of the liquid crystal display apparatus shown in FIG. 1.

However, as shown in FIG. 3, since a period turned on the TFT at the 120 Hz frame rate is a half of a period turned on the TFT at the 60 Hz frame rate, a voltage of liquid crystal responding to a falling edge of a drive pulse is not lowered enough to represent a target gray voltage. At this time, in case an over drive pulse is applied to the liquid crystal at the next frame, the ghost phenomenon generates.

To eliminate the ghost phenomenon, it is necessary to reduce the fall response time of the liquid crystal which is expressed as follows.

$$\tau_{\mathit{off}} \propto \left(\frac{d}{\pi}\right)^2 \frac{\gamma_1}{K_{\mathit{eff}}}$$

where $\tau_{\mathit{off}}$ is the fall response time, d is the cell gap, $\gamma_1$ is the rotational viscosity of the liquid crystal, and $K_{\mathit{eff}}$ is the effective elastic constant respectively. To reduce the fall response time, the effective elastic constant should be increased or the cell gap, or the rotational viscosity decreased.

Accordingly, each liquid crystal 300 may include an appropriate weight ratio of the negative compound material. If the weight ratio of the negative compound material is too low, the beneficial influences of the negative compound material may not be exhibited. In contrast, if the weight ratio of the negative compound material is too high, the liquid crystal 300 may increase the rotational viscosity.

The liquid crystal 300 may comprise neutral compound material influencing the rotational viscosity. In general, the neutral compound material may lower the rotational viscosity of the liquid crystals 300, thereby enhancing the alignment speed of the liquid crystals 300 in response to an electric field. As a result, the neutral compound material may improve the operation speed of the liquid crystal display apparatus.

The negative compound material may include at least one compound expressed by one of the following chemical formulas 1, 2, 3, and 4. Moreover, the neutral compound material may include at least one compound expressed by one of the following chemical formulas 5, 6, and 7.

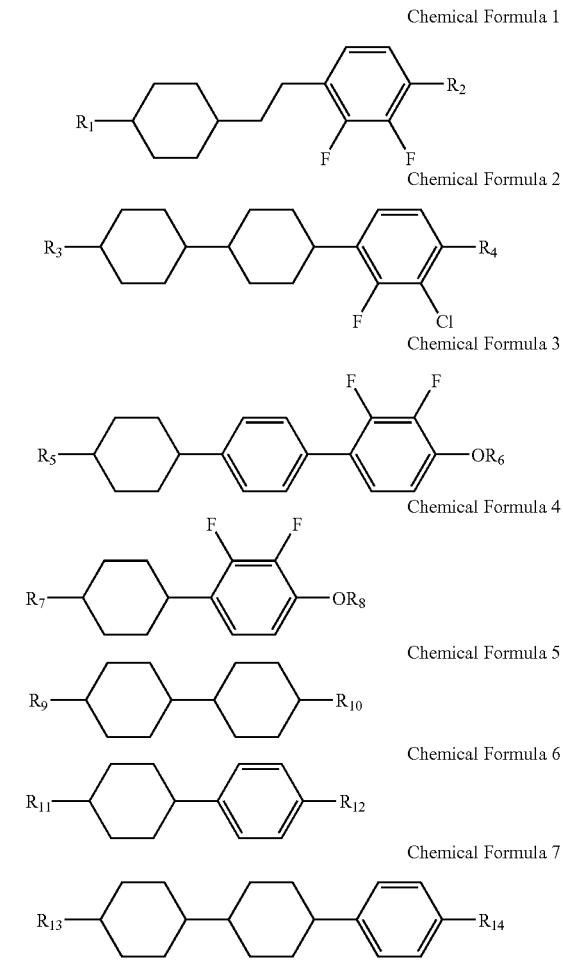

Chemical Formula 1

Chemical Formula 2

Chemical Formula 3

Chemical Formula 4

Chemical Formula 5

Chemical Formula 6

Chemical Formula 7 wherein, at least two of "$R_1$", "$R_2$", "$R_3$", "$R_4$", "$R_5$", "$R_6$", "$R_7$", "$R_8$", "$R_9$", "$R_{10}$", "$R_{11}$", "$R_{12}$", "$R_{13}$" and "$R_{14}$" are identical to or different from each other, and each of "$R_1$", "$R_2$", "$R_3$", "$R_4$", "$R_5$", "$R_6$", "$R_7$", "$R_8$", "$R_9$", "$R_{10}$", "$R_{11}$", "$R_{12}$", "$R_{13}$" and "$R_{14}$" may include one of an alkyl group, an alkenyl group and an alkoxy group, which have one, two, three, four, five, six, seven, eight, nine, or ten carbon molecules. The neutral compound material does not include an element, such as a fluorine atom, which has a high electron affinity, to exhibit polarity. In contrast, the negative material may include one or more fluorine atoms. To find a liquid crystal composition which can improve the response time, various experimental samples are chosen as follows Table 1:

TABLE 1

| Components | LC 1 | LC 2 | LC 3 | LC 4 | LC 5 | LC 6 | LC 7 |
|---|---|---|---|---|---|---|---|
| [structure with $R_1$, $R_2$, F, F] | 36 wt % | — | — | — | — | — | — |

TABLE 1-continued

| Components | LC 1 | LC 2 | LC 3 | LC 4 | LC 5 | LC 6 | LC 7 |
|---|---|---|---|---|---|---|---|
| 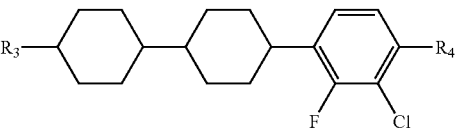 | 13 wt % | 11 wt % | 11 wt % | 8 wt % | 9 wt % | 6 wt % | 11 wt % |
| 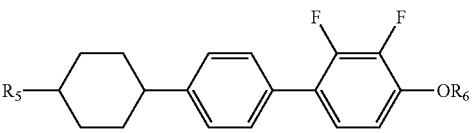 | 16 wt % | 23 wt % | 21 wt % | 23 wt % | 20 wt % | 23 wt % | 21 wt % |
| 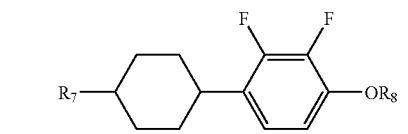 | — | 22 wt % | 25 wt % | 24 wt % | 21 wt % | 25 wt % | 25 wt % |
| 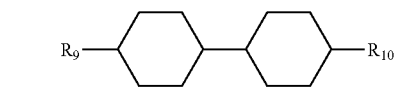 | 19 wt % | 29 wt % | 27 wt % | 26 wt % | 27 wt % | 26 wt % | 27 wt % |
| 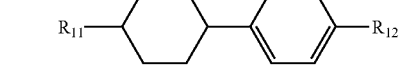 | — | — | — | 2 wt % | 8 wt % | 3 wt % | 2 wt % |
|  | 16 wt % | 15 wt % | 16 wt % | 17 wt % | 15 wt % | 17 wt % | 14 wt % |

Referring to Table 1, the first sample LC 1 includes a negative compound material including compounds expressed by the chemical formulas 1, 2 and 3 and a neutral compound material including compounds expressed by the chemical formulas 5 and 7. The second sample LC 2 and the third sample LC 3 include a negative compound material including compounds expressed by the chemical formulas 2, 3 and 4 and a neutral compound material including compounds expressed by the chemical formulas 5 and 7. The fourth sample LC 4 to the seventh sample LC 7 include a negative compound material including compounds expressed by chemical formulas 2, 3 and 4 and a neutral compound material including compounds expressed by chemical formulas 5, 6 and 7.

The physical properties of the first to seventh samples LC 1 to LC 7 are described in Table 2 below.

TABLE 2

| Property | LC 1 | LC 2 | LC 3 | LC 4 | LC 5 | LC 6 | LC 7 |
|---|---|---|---|---|---|---|---|
| Tni | 80 | 80.1 | 77.8 | 78.1 | 74.9 | 74.7 | 74 |
| $\Delta n$ | 0.090 | 0.092 | 0.092 | 0.094 | 0.092 | 0.092 | 0.092 |
| $\Delta\epsilon$ | −3.3 | −3.2 | −3.4 | −3.3 | −2.9 | −3.2 | −3.4 |
| $\gamma 1$ | 149.2 | 112.7 | 113.1 | 112.1 | 103.3 | 107.7 | 109.5 |

Referring to Table 2, the properties of the liquid crystal include a phase transition temperature Tni, a diffractive anisotropy $\Delta n$ against light having a wavelength of 589 nm, a dielectric anisotropy $\Delta\epsilon$, and the rotational viscosity $\gamma_1$.

Figure 4A:
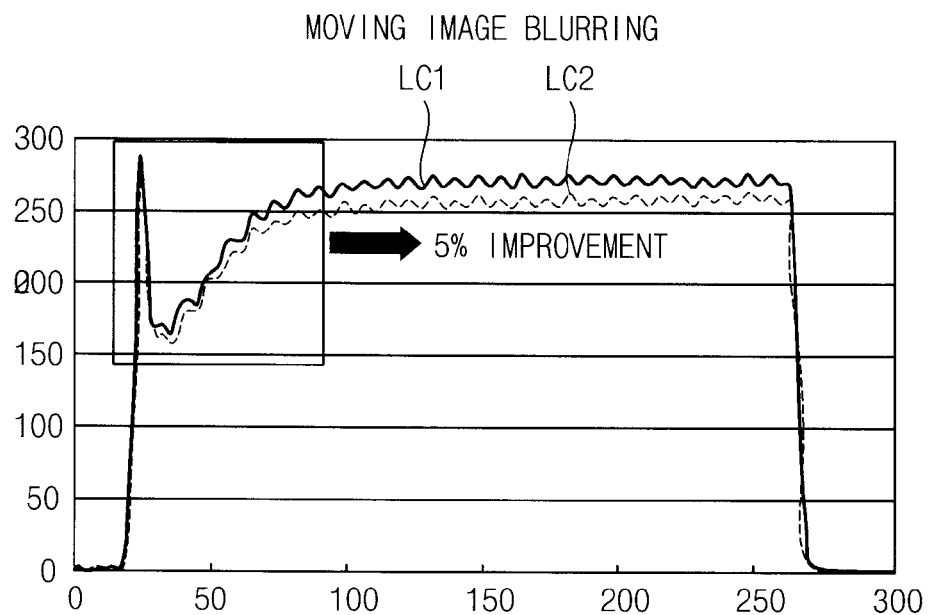
FIGS. 4A and 4B are time charts showing an optical response time of display luminance between gray levels of the liquid crystal display apparatus shown in FIG. 1, which includes a liquid crystal sample.
Figure 4B:
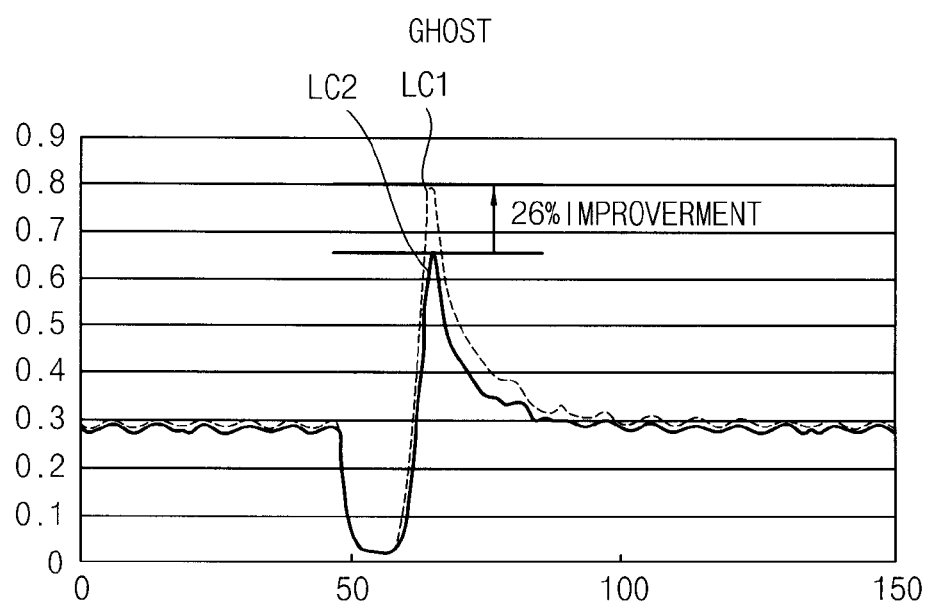

As can be seen from Tables 1 and 2, although the second sample LC 2 comprises the lower amount of the negative compound material than the first sample LC 1, the second sample LC 2 exhibited the lower rotational viscosity than the first sample LC 1. As can be also seen from FIGS. 4A and 4B, the image blurring of the second sample LC 2 is improved 5% compared with that of the first sample LC 1 and the ghost of the second sample LC 2 is improved 26% compared with that of the first sample LC 1. To improve the image blurring and the ghost, it is found that the negative compound expressed by the formula 1 should be replaced by the negative compound expressed by the formula 4.

Referring to Table 2, as the amount of the negative compound material is decreased, the rotational viscosity is generally decreased and therefore the moving image characteristic is expected to improve. However, as the rotational viscosity is decreased, the dielectric anisotropy is also decreased and therefore the luminance is deteriorated The physical properties and the moving image characteristic of the first, second, sixth and seventh samples LC 1, LC 2, LC 6 and LC 7 are described in Table 3 below.

TABLE 3

| property | LC 1 | LC 2 | LC 5 | LC 7 |
|---|---|---|---|---|
| Tni | 80 | 80.1 | 74.9 | 74 |
| $\Delta\epsilon$ | −3.3 | −3.2 | −2.9 | −3.4 |
| $\gamma 1$ | 149.2 | 112.7 | 103.3 | 109.5 |
| Lw | 98 | 104 | 94 | 101 |
| Image blurring | 124 | 119 | 78 | 86 |
| ghost | 132 | 106 | 86 | 98 |

The fifth sample LC 5 exhibited the lower rotational viscosity, the image blurring of the fifth sample LC 5 is improved 46% compared with that of the first sample LC 1 and the ghost of the fifth sample LC 5 is improved 46% compared with that of the first sample LC 1. However, the fifth sample LC 5 exhibited the lower dielectric anisotropy than the first sample LC 1 and therefore the white luminance Lw of is deteriorated.

The seventh sample LC 7 exhibited the lower rotational viscosity, the image blurring of the seventh sample LC 7 is improved 38% compared with that of the first sample LC 1 and the ghost of the seventh sample LC 7 is improved 34% compared with that of the first sample LC 1. However, the seventh sample LC 7 exhibited the lower dielectric anisotropy than the first sample LC 1 and therefore the white luminance Lw of is deteriorated.

Referring to FIG. 5, FIG. 6, FIG. 7, FIG. 8, and FIG. 9, the LCD apparatus according to the present exemplary embodiment may include a thin film transistor panel 600 and a common electrode panel 700, and a liquid crystal layer 503 disposed therebetween.

The liquid crystal layer 503 may include a plurality of liquid crystals 810, and each liquid crystal 810 may include various compounds having different physical properties. The liquid crystal 810 may have a core group acting as a central axis and at least one of a terminal group and a lateral group connected to the core group.

The core group may include at least one cyclic compound of a phenyl group, a cyclohexyl group, and a heterocyclic compound. Each of the terminal group and the lateral group may include at least one of a non-polar group and a polar group. The non-polar group may correspond to an alkyl group, an alkoxy group, or an alkenyl group, and the polar group may correspond to a fluorine atom. Physical properties of the liquid crystal 810 may be determined by the terminal group and/or the lateral group.

The polar compound material may have dielectric anisotropy $\Delta\in$ and diffractive anisotropy $\Delta n$, and the polar compound material may include a lateral group having at least one fluorine atom.

The dielectric anisotropy $\Delta\in$ may correspond to a difference between a horizontal dielectric constant $\in\|$ along a direction parallel to a length direction of the liquid crystal 810 and a vertical dielectric constant $\in\perp$ along a direction perpendicular to the length direction of the liquid crystal 810. When the horizontal dielectric constant $\in\|$ is greater than the vertical dielectric constant $\in\perp$, the liquid crystal 810 may have positive dielectric anisotropy. Alternatively, when the horizontal dielectric constant $\in\|$ is less than the vertical dielectric constant $\in\perp$, the liquid crystal 810 may have negative dielectric anisotropy.

When an electric field is applied to the liquid crystal 810 having positive dielectric anisotropy, the liquid crystal 810 may be arranged parallel to the electric field. On the other hand, when an electric field is applied to the liquid crystal 810 having negative dielectric anisotropy, the liquid crystal 810 may be arranged perpendicular to the electric field. Accordingly, the liquid crystals 810 having positive dielectric anisotropy may be used in a horizontal alignment type LCD apparatus, and the liquid crystals 810 having negative dielectric anisotropy may be used in a vertical alignment type LCD apparatus.

The liquid crystals 810 according to the present exemplary embodiments may be applied to the vertical alignment type LCD apparatus and may include the compound material having negative dielectric anisotropy (e.g., a negative compound material).

The negative compound material may include at least one compound expressed by one of the aforementioned chemical formulas 1, 2, 3, and 4.

The liquid crystal 810 may include about 50 wt % to about 65 wt % of the negative compound material.

The dielectric anisotropy $\Delta\in$ of the aforementioned liquid crystals 810 may have a negative value since the liquid crystals 810 are applicable to a vertical alignment type LCD apparatus.

As described above, the liquid crystal 810 may include about 50 wt % to about 65 wt % of the negative compound material. Thus, the vertical dielectric constant $\in\perp$ of the liquid crystal 810 may increase since the negative compound material content is over 50 wt %. In contrast, when the negative compound material content is over 65 wt %, the reliability of the liquid crystal 810 may be degraded and the viscosity of the liquid crystal 810 may be increased. Therefore, the neutral compound material content should be relatively decreased when the negative compound material content increases.

Notwithstanding that the liquid crystal 810 is used in a vertical alignment type LCD apparatus, the liquid crystal 810 may include a low content of about 2 wt % to about 15 wt % of the positive compound material. If the positive compound material content exceeds 2 wt %, the horizontal dielectric constant $\in\|$ of the liquid crystal 810 may also increase. Further, if the positive compound material content exceeds 15 wt %, the movement of the liquid crystal 810 may become more dulled. In this case, it may be necessary to increase the operating voltage of the LCD apparatus.

If the liquid crystal 810 includes the positive compound material, the dielectric anisotropy $\Delta\in$ of the liquid crystal 810 may be lowered to have a negative value within a range of about −2.9 to −3.4. The liquid crystal 810 may have a phase transition temperature Tni of about 74° C. to about 81° C. and a diffractive anisotropy $\Delta n$ of about 0.1 or the less.

The liquid crystal 810 may include a neutral compound material that does not have dielectric anisotropy and a polar compound material that has dielectric anisotropy.

The neutral compound material does not have dielectric anisotropy but has a diffractive anisotropy. The neutral compound material may serve to appropriately maintain the viscosity of the liquid crystal 810. The neutral compound material may include at least one compound expressed by one of the aforementioned chemical formulas 5, 6, and 7.

The liquid crystal 810 may include about 40 wt % to about 50 wt % of the neutral compound material. When the content of the neutral compound material is within the range of about 40 wt % to about 50 wt %, the liquid crystal 810 may have an appropriate viscosity without the deterioration of the moving image characteristic.

Now, descriptions to the thin film transistor panel 600 will be developed with reference to FIG. 5, FIG. 6, FIG. 7, FIG. 8, and FIG. 9 in connection with the LCD apparatus employing the above-described liquid crystals 810.

Figure 5:
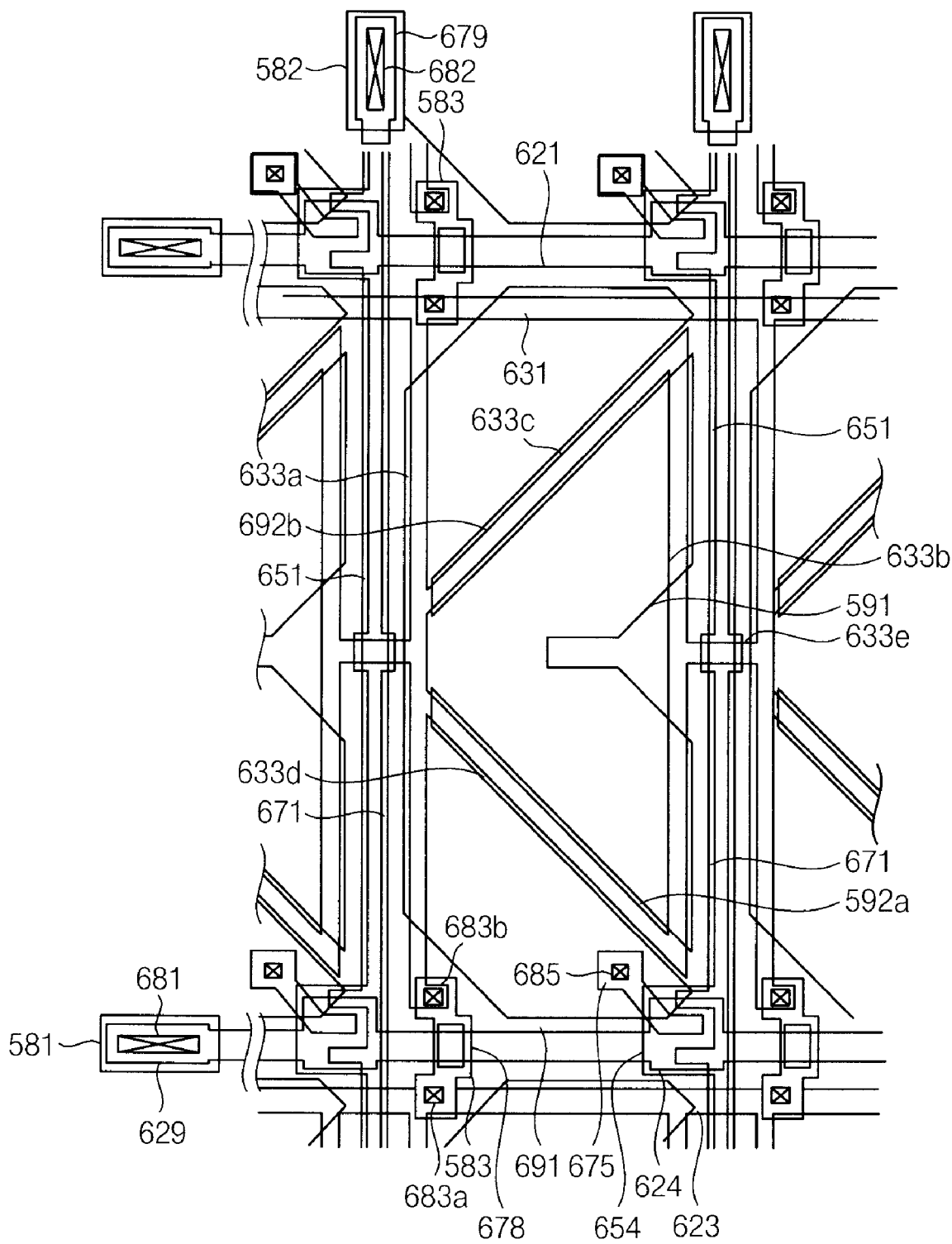
FIG. 5 is a plan view showing a thin film transistor panel according to another exemplary embodiment of the present invention.
Figure 6:
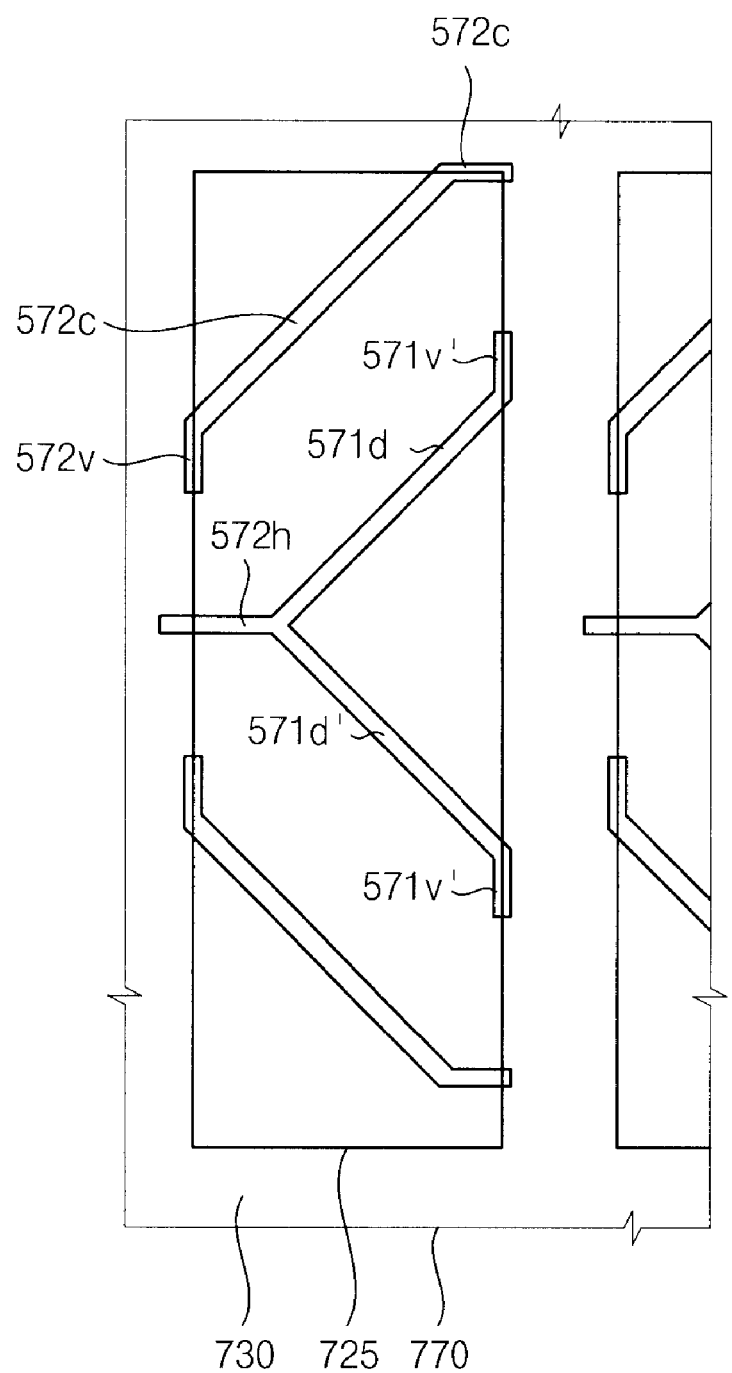
FIG. 6 is a plan view showing a common electrode panel used in a liquid crystal display apparatus according to another exemplary embodiment of the present invention.
Figure 7:
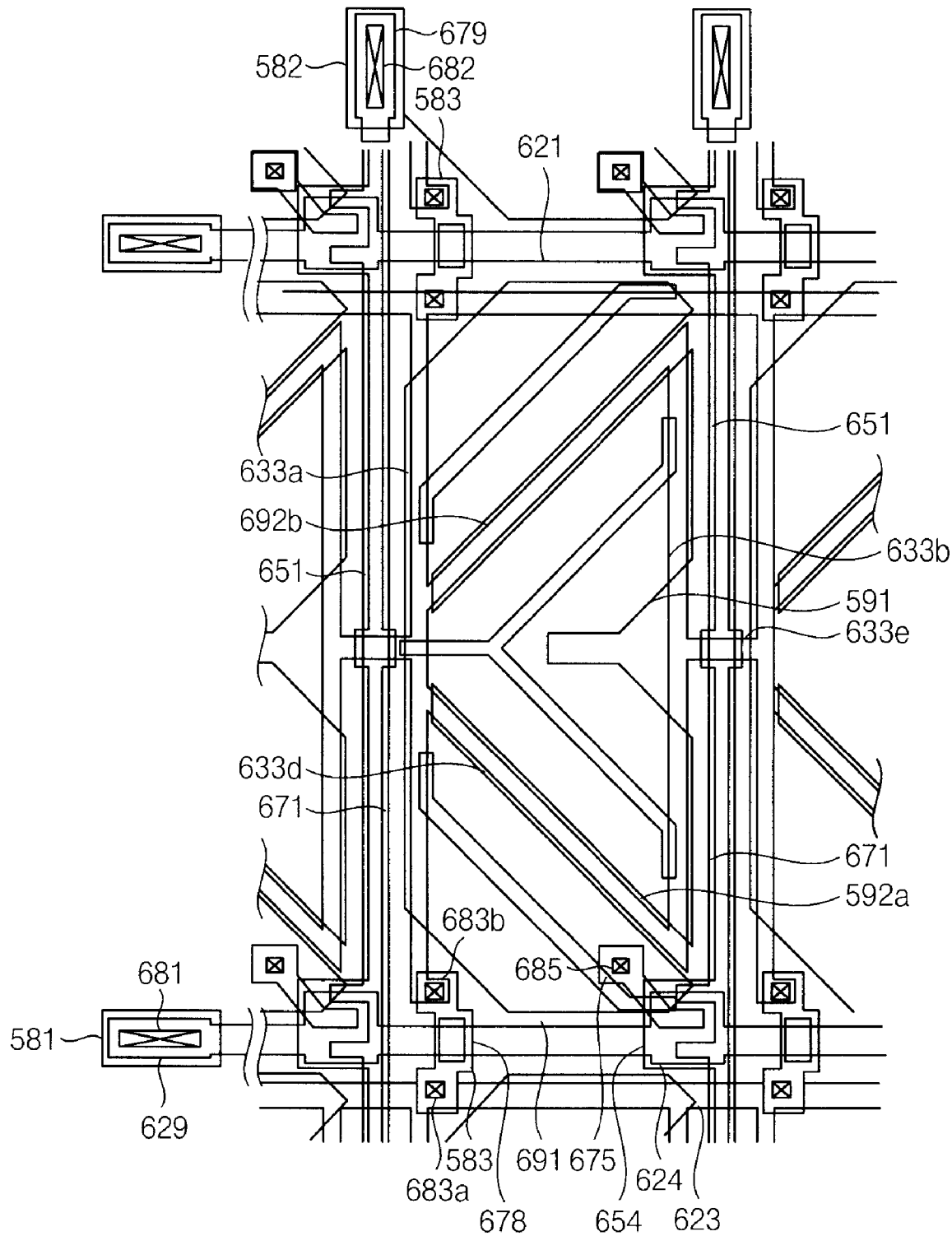
FIG. 7 is a plan view showing a liquid crystal display apparatus employing the thin film transistor panel of FIG. 5 and the common electrode panel of FIG. 6.

Referring to FIG. 5, FIG. 6, FIG. 7, FIG. 8, and FIG. 9, a plurality of gate lines 621 and a plurality of storage lines 631 may be disposed on an insulator substrate 610, which may include transparent glass or transparent plastic material. The gate lines 621 may be disposed in a row direction to be parallel (e.g., parallel to an x-axis) as shown in FIG. 5 and FIG. 7. Each gate line 621 may include a plurality of gate electrodes 624 that are located in some portions of the gate line 621 and a gate pad 629 that is located at an end of the gate line 621. The gate electrodes 624 may have a width that is greater than that of the gate line 621. Similarly, the gate pad 629 may also have a width that is greater than that of the gate line 621. The gate pad 629 may act as a contact pad to connect the gate line 621 with another conductive line or an external circuit.

Each storage line 631 may include a main storage line that is disposed parallel to the gate line 621 adjacent thereto, a plurality of storage electrode groups that are split from the main storage line, and a plurality of connections 633e that connect the adjacent storage electrode groups. Each storage electrode group may include a plurality of storage electrodes, for example, first, second, third, and fourth storage electrodes 633a, 633b, 633c, and 633d, which are directly or indirectly connected to the main storage line.

The first storage electrodes 633a may extend from the main storage line in a column direction to be parallel (e.g., parallel to a y-axis) as shown in FIG. 5 and FIG. 7. The second storage electrodes 633b may be disposed parallel to the first storage electrodes 633a. Each first storage electrode 633a may include a fixed portion directly connected to the main storage line and a free portion serially connected to the fixed portion. The third and fourth storage electrodes 633c and 633d may be disposed between the first and second storage electrodes 633a and 633b. The third storage electrode 633c may connect a central portion of the first storage electrode 633a (e.g., a portion between the fixed portion and the free portion) to one end of the second storage electrode 633b, and the fourth storage electrode 633d may connect the central portion of the first storage electrode 633a to the other end of the second storage electrode 633b. The storage electrode groups may be disposed in a plurality of pixel areas, respectively. The second storage electrode 633b in a specific pixel area may be connected to the first storage electrode 633a in another pixel area that is adjacent to the specific pixel area along the row direction, by one of the connections 633e. The configuration and location of each storage line 631 (including the storage electrodes 633a, 633b, 633c, and 633d) may be embodied in many different forms and should not be construed as limited to the exemplary embodiments set forth herein. If the liquid crystal layer 503 produces a sufficient liquid crystal capacitance to prevent the kick back phenomenon without the storage electrodes 633a, 633b, 633c, and 633d, the storage lines 631 including the storage electrodes 633a, 633b, 633c, and 633d may be omitted.

The gate lines 621 and the storage lines 631 may include a metal layer having low electrical resistance. For example, the gate lines 621 and the storage lines 631 may include a metal layer containing aluminum (Al), a metal layer containing silver (Ag), a metal layer containing copper (Cu), a metal layer containing molybdenum (Mo), a chrome layer, a tantalum layer, or a titanium layer. In another exemplary embodiment, the gate lines 621 and the storage lines 631 may include a multi-level conductive layer including at least two conductive layers having different physical properties from each other.

The gate lines 621 and the storage lines 631 (including the storage electrodes 633a, 633b, 633c, and 633d) may include positive sloped sidewalls having an inclination of about 30 degrees to 80 degrees with respect to a main surface of the substrate 610. When a sidewall of a line is referred to as being positively sloped, it will be understood that a top width of the line is less than a bottom width thereof.

A gate insulating layer 640 may be disposed to cover the gate lines 621, the storage lines 631, and the substrate 610. The gate insulating layer 640 may include an insulating layer, such as a silicon nitride layer or a silicon oxide layer. A plurality of line-shaped semiconductor patterns 651 may be disposed on the gate insulating layer 640, and the line-shaped semiconductor patterns 651 may include a hydrogenated amorphous silicon (a-Si:H) layer or a polysilicon layer. Each line-shaped semiconductor pattern 651 may be disposed to cross over the gate lines 621 and may have extensions 654 that overlap the gate electrodes 624.

A plurality of line-shaped ohmic contact members (not shown) may be disposed across the semiconductor patterns 651 respectively, and a plurality of island-shaped ohmic contact members 665 may be disposed on the semiconductor patterns 651 respectively. Each line-shaped ohmic contact member may include a protrusion 663 that overlaps a portion of the semiconductor extension 654. The protrusion 663 of the line-shaped ohmic contact member and the island-shaped ohmic contact member 665 may be disposed on both ends of the extension 654, respectively. The protrusions 663 and the island-shaped ohmic contact members 665 may act as source-side ohmic contact members and drain-side ohmic contact members, respectively. The ohmic contact members 663 and 665 may include an amorphous silicon layer heavily doped with n-type impurities, such as phosphorous ions or a metal silicide layer.

The semiconductor patterns 651 and the ohmic contact members 663 and 665 may also include positive sloped sidewalls having an inclination of about 30 degrees to about 80 degrees with respect to the main surface of the substrate 610. A plurality of data lines 671, a plurality of drain electrodes 675, and a plurality of isolated conductive patterns 678 may be disposed on the ohmic contact members 663, the ohmic contact members 665, and the gate insulating layer 640, respectively.

The data lines 671 may act as transmission lines for data signals and may extend to cross over the gate lines 621, the main storage lines of the storage lines 631, and the connections 633e. Each data line 671 may include a plurality of source electrodes 673 that respectively overlap the ohmic contact members 663 arrayed along a column direction. In addition, each data line 671 may further include a data line pad 679 connected to an end thereof. The data line pad 679 may act as a contact pad to connect the data line 671 with another conductive line or an external circuit.

The drain electrodes 675 may be spaced apart from the source electrodes 673, and the drain electrodes 675 and the source electrodes 673 may be disposed on a single semiconductor extension 654 of the semiconductor pattern 651 to face each other. Each drain electrode 675 may include a drain pad extending from one end thereof, and the other end of the drain electrode 675 may be surrounded by the source electrode 673, as shown in FIG. 5, FIG. 6, and FIG. 7. The single semiconductor extension 654, the gate electrode 624 overlapping the single semiconductor extension 654, and the single source and drain electrodes 673 and 675 overlapping the single semiconductor extension 654 may constitute a thin film transistor. The semiconductor extension 654 between the source and drain electrodes 673 and 675 may act as a channel region of the thin film transistor.

The isolated conductive patterns 678 may be disposed adjacent to ends of the first storage electrodes 633a, respectively. The data lines 671, the drain electrodes 675, and the isolated metal patterns 678 may include a conductive layer having a low electric resistance, for example, a metal silicide layer.

The data lines 671 (including the source electrodes 673), the drain electrodes 675, and the isolated conductive patterns 678 may also include positive sloped sidewalls having an inclination of about 30 degrees to 80 degrees with respect to the main surface of the substrate 610. The line-shaped ohmic contact members including the source-side ohmic contact members 663 may be disposed between the line-shaped semiconductor patterns 651 and the data lines 671 stacked on the line-shaped semiconductor patterns 651, thereby reducing contact resistances therebetween. Similarly, the island-shaped ohmic contact members 665 may be disposed between the line-shaped semiconductor patterns 651 and the drain electrodes 675 stacked on the line-shaped semiconductor patterns 651, thereby reducing contact resistances therebetween.

The data lines 671, the drain electrodes 675, the isolated conductive patterns 678, and the semiconductor patterns 651 may be covered with a passivation layer 680. A plurality of pixel electrodes 691, a plurality of overpasses 583, and a plurality of contact assistants 581 and 582 may be disposed on the passivation layer 680. The pixel electrodes 691, the overpasses 583, and the contact assistants 581 and 582 may include a transparent conductive layer or a reflective metal layer. The transparent conductive layer may include an indium tin oxide (ITO) layer or an indium zinc oxide (IZO) layer, and the reflective metal layer may include an aluminum layer, a silver layer, a chrome layer, or an alloy layer of aluminum, silver, or chrome.

Each respective pixel electrode 691 may be directly connected to the corresponding drain electrode 675 through one of contact holes 685, which penetrate the passivation layer 680. Thus, when a data voltage is applied to any one data line 671 selected from the data lines 671 and one of the thin film transistors connected to the selected data line 671 is selectively turned on, the data voltage may be applied to the pixel electrode 691 connected to the selected thin film transistor through the drain electrode 675 of the selected thin film transistor. In this case, if a common voltage is applied to a common electrode 770 disposed on the common electrode panel 700 facing the insulating substrate 610, an electric field may be generated between the common electrode 770 and the pixel electrode 691 to which the data voltage is applied. The electric field between the common electrode 770 and the pixel electrode 691 may influence the alignment of the liquid crystals 810 between the common electrode 770 and the pixel electrode 691, and polarization of light penetrating the liquid crystals 810 may depend on the alignment direction of the liquid crystals 810.

A pixel electrode 691 and the common electrode 770 may constitute a liquid crystal capacitor. Thus, even after the thin film transistor is turned off, the data voltage applied to the pixel electrode 691 may be maintained for awhile. Further, the pixel electrode 691 may overlap the storage line 631 including the storage electrodes 633a, 633, 633c, and 633d. Thus, the pixel electrode 691 and the storage line 631 may constitute a storage capacitor. The storage capacitor and the liquid crystal capacitor may be connected in parallel. Accordingly, the storage capacitor may increase a data voltage holding time of the liquid crystal capacitor. In other words, the storage capacitor may improve a data retention characteristic of the pixel.

Each pixel electrode 691 may have a rectangular-shaped configuration including four main sides and four chamfered corners when viewed from a plan view. First and second main sides of the pixel electrode 691 may face each other and are parallel to the data lines 671, and third and fourth main sides of the pixel electrode 691 may face each other and are parallel to the gate lines 621. Each chamfered corner of the pixel electrode 691 may include an oblique side having an inclination of about 45 degrees with respect to the gate lines 621. Further, the pixel electrode 691 may be divided into a plurality of partitions by a first cutting region 592a, a second cutting region 592b, and a central cutting region 591, which penetrate the pixel electrode 691. In addition, a horizontal straight line, which passes through a central point of the pixel electrode 691 and is parallel to the gate lines 621, may divide the pixel electrode 691 into a first half region and a second half region.

The first half region of the pixel electrode 691 may be symmetrical to a second half region thereof with respect to the horizontal straight line.

The first cutting region 592a may extend from a right bottom corner of the pixel electrode 691 toward a central point of the left side thereof, and the second cutting region 592b may extend from a right top corner of the pixel electrode 691 toward the central point of the left side thereof. That is, the first and second cutting regions 592a and 592b may have a line-shaped configuration. In an exemplary embodiment, the first and second cutting regions 592a and 592b may overlap the fourth storage electrode 633d and the third storage electrode 633c, respectively. Therefore, the first and second cutting regions 592a and 592b may be disposed in the first and second half regions of the pixel electrode 691, respectively. An angle between the first and second cutting regions 592a and 592b may be about 90 degrees, and extension lines of the first and second cutting regions 592a and 592b may meet the gate lines at an angle of about 45 degrees.

The central cutting region 591 may extend from a central region of the right side toward a central region of the left side along the horizontal straight line. An inlet portion of the central cutting region 591 may have a pair of oblique sides that are parallel to the first and second cutting regions 592a and 592b respectively. As a result, the first cutting region 592a may divide the first half region of the pixel electrode 691 into two separate regions, and the second cutting region 592b may divide the second half region of the pixel electrode 691 into two separate regions. The pixel electrode 691 may be embodied in many different forms and should not be construed as limited to the exemplary embodiments set forth herein. For example, the number of the cutting regions 591, 592a, and 592b and the dimension of the pixel electrode 691 may be changed according to properties of the liquid crystal layer 503 and a design scheme of the LCD apparatus.

The overpasses 583 may cross over the gate lines 621. One end of each overpass 583 may be connected to one of the storage lines 631 through a contact hole 683a that penetrates the passivation layer 680 and the gate insulating layer 640, and the other end of each of the overpasses 583 may be connected to one of the first storage electrodes 633a through a contact hole 683b that penetrates the passivation layer 680 and the gate insulating layer 640. The storage lines 631 including the storage electrodes 633a and 633b may be used to repair the gate lines 621, the data lines 671, or the thin film transistors that have defects.

Each contact assistant 581 may be connected to one of the gate pads 629 through one of contact holes 681 that penetrate the passivation layer 680. Similarly, each contact assistant 582 may be connected to one of the data line pads 679 through one of contact holes 682 that penetrate the passivation layer 680 and the gate insulating layer 640. The contact assistants 581 may improve the adhesion between the gate pads 629 and other conductive lines to be connected thereto, and the contact assistants 582 may improve the adhesion between the data line pads 679 and other conductive lines to be connected thereto. Further, the contact assistants 581 and 582 may protect the gate pads 629 and the data line pads 679.

Figure 8:
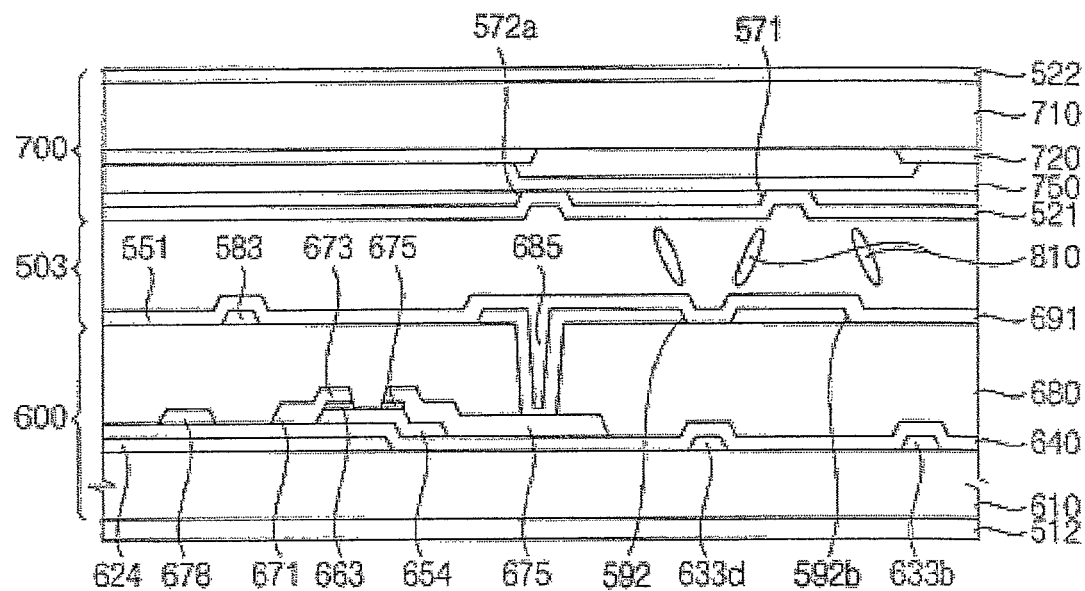
FIG. 8 is a cross sectional view taken along line IV-IV' of FIG. 7.

Now, descriptions to the common electrode panel 700 will be developed with reference to FIG. 6, FIG. 7, and FIG. 8 in more detail.

Referring again to FIG. 6, FIG. 7, and FIG. 8, an optical blocking layer 720 may be disposed on an insulating substrate 710, which may include transparent glass or transparent plastic material. The optical blocking layer 720 may be referred to as a black matrix. The optical blocking layer 720 may block light that passes through gap regions between the pixel electrodes 691. That is, the optical blocking layer 720 may have a plurality of openings 725 that face the pixel electrodes 691, respectively. As a result, each opening 725 may have almost the same configuration as the corresponding pixel electrode 691. In addition, the optical blocking layer may include a first portion that faces the gate lines 621 and the data lines 671 and a second portion that faces the thin film transistors.

A plurality of color filters 730 may be disposed on the openings 725, respectively. In another exemplary embodiment, the color filters 730 located in each column of the pixel areas may extend along the y-axis (refer to FIG. 7). In this case, the color filters 730 in each column may be connected to each other, thereby providing a single color filter line. Each color filter 730 may be one of a red color filter, a green color filter, and a blue color filter.

The color filters 730 and the optical blocking layer 720 may be covered with an overcoat layer 750. The overcoat layer 750 may include an organic insulating layer. The overcoat layer 750 may prevent the color filters 730 from being exposed and may have a flat surface. In other exemplary embodiments, the overcoat layer 750 may be omitted.

A common electrode 770 may be disposed on the overcoat layer 750. When the overcoat layer 750 is not provided, the common electrode 770 may be directly disposed on the optical blocking layer 720 and the color filters 730. The common electrode 770 may include a transparent conductive layer such as an indium tin oxide (ITO) layer or an indium zinc oxide (IZO) layer. A plurality of cutting region groups may be provided to penetrate the common electrode 770. Each cutting region group may include a plurality of cutting regions. For example, each cutting region group may include a first cutting region 572a, a second cutting region 572b, and a central cutting region 571.

The cutting regions 571, 572a, and 572b may be disposed not to overlap the cutting regions 591, 592a, and 592b of the pixel electrode 691. For example, the first cutting region 572a may be disposed between the first cutting region 592a of the pixel electrode 691 and the chamfered oblique side of the left bottom corner of the pixel electrode 691, as shown in FIG. 7. Similarly, the second cutting region 572b may be disposed between the second cutting region 592b of the pixel electrode 691 and the chamfered oblique side of the left top corner of the pixel electrode 691, as shown in FIG. 7. Further, the central cutting region 571 may be disposed between the first and second cutting regions 592a and 592b and the central cutting region 591 of the pixel electrode 691, as shown in FIG. 7. Each cutting region 571, 572a, and 572b may include at least one diagonal portion that is parallel to the first cutting region 592a or the second cutting region 592b of the pixel electrode 691. Each cutting region group (including the first cutting region 572a, the second cutting region 572b, and the central cutting region 571) may have a line symmetry configuration. In this case, the horizontal straight line of the pixel electrode 691 may act as an axis of symmetry.

Figure 9:
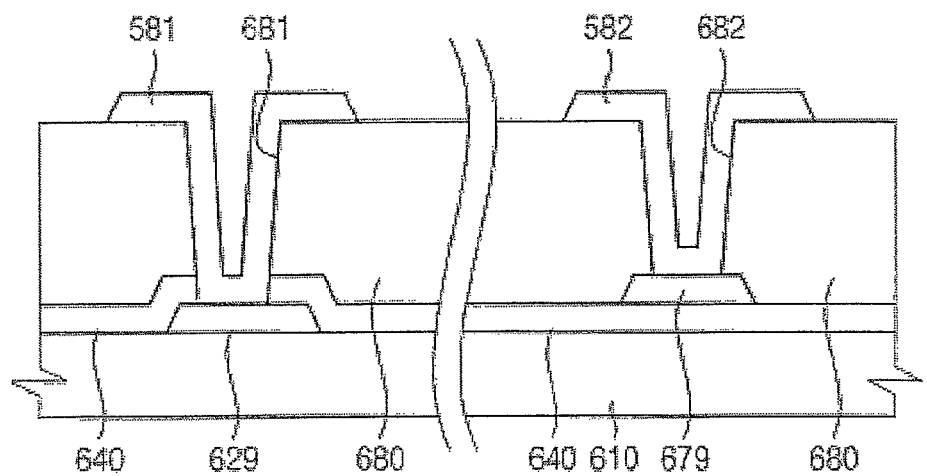
FIG. 9 is a cross sectional view taken along line V-V' of FIG. 7.

Each of the first and second cutting regions 572a and 572b may include a diagonal portion 572d, a vertical portion 572v parallel to the y-axis, and a horizontal portion 572h parallel to the x-axis, as shown in FIG. 8 and FIG. 9. The horizontal portion 572h may extend from one end of the diagonal portion 572d, and the vertical portion 572v may extend from the other end of the diagonal portion 572d.

The central cutting region 571 may include a central horizontal portion 571h, first and second diagonal portions 571d' and 571d'', and first and second vertical portions 571v' and 571v''. The central horizontal portion 571h may be disposed to extend from a central point of the left side of the pixel electrode 691 toward the right side of the pixel electrode 691 when viewed from the plan views of FIG. 6 and FIG. 7. The first diagonal portion 571d' may extend from a right end of the central horizontal portion 571h to be parallel to the diagonal portion 572d of the first cutting region 572a, and the second diagonal portion 571d'' may extend from the right end of the central horizontal portion 571h to be parallel to the diagonal portion 572d of the second cutting region 572b. In addition, the first vertical portion 571v' of the central cutting region 571 may extend from a right end of the first diagonal portion 571d' to be parallel to the y-axis, and second vertical portion 571v'' of the central cutting region 571 may extend from the right end of the second diagonal portion 571d'' to be parallel to the y-axis.

The cutting regions 571, 572a, and 572b penetrating the common electrode 770 may be embodied in many different forms and should not be construed as limited to the exemplary embodiments set forth herein. For example, the number and the configuration of the cutting regions 571, 572a, and 572b may be changed according to properties of the liquid crystal layer 503 and a design scheme of the LCD apparatus. The optical blocking layer 720 may further include a plurality of optical blocking patterns disposed to overlap the cutting regions 571, 572a, and 572b. The optical blocking patterns may block light that passes through the cutting regions 571, 572a, and 572b.

When a common voltage is applied to the common electrode 770 and a data voltage is applied to the pixel electrode 691, an electric field may be generated between the common electrode 770 and the pixel electrode 691. A direction of the electric field may be substantially perpendicular to the electrodes 691 and 770. If the liquid crystals 810 have negative dielectric anisotropy, the liquid crystals 810 between the electrodes 691 and 770 may be arranged perpendicular to the electric field. The electric field may be distributed such that it is not perpendicular to the electrodes 691 and 770. This is due to the presence of the common electrode cutting regions 571, 572a, and 572b, and the pixel electrode cutting regions 591, 592a, and 592b, which do not overlap with each other. As a result, the liquid crystals 810 between the electrodes 691 and 770 may be arranged tilted when the common voltage and the data electrode are applied to the common electrode 770 and the pixel electrode 691, respectively.

Referring again to FIG. 7, the cutting regions 571, 572a, and 572b and 591, 592a, and 592b may divide the liquid crystal layer 503 in a single pixel area into a plurality of sub-pixel areas. Each sub-pixel area may include a pair of primary sides that intersect the x-axis at an angle of about 45 degrees. The primary sides of each sub-pixel area may intersect a polarization axis of polarizing plates (refer to reference numerals "512" and "522" of FIG. 8) at an angle of about 45 degrees. Thus, the light efficiency of the LCD apparatus may be maximized.

Most the liquid crystals 810 in each sub-pixel area may be tilted in a direction substantially perpendicular to the primary sides of each sub-pixel area. Thus, the liquid crystals 810 in each pixel area may include four groups of liquid crystals 810, which are arranged along four different directions respectively. If the number of alignment directions of the liquid crystals 810 increase, a viewing angle of the LCD apparatus may be improved.

The cutting regions 571, 572a, and 572b and 591, 592a, and 592b may be embodied in many different forms and should not be construed as limited to the exemplary embodiments set forth herein. For example, at least one of the cutting regions 571, 572a, and 572b and 591, 592a, and 592b may be replaced with a protrusion or a recession. The protrusion may include an organic material layer or an inorganic material layer and may be disposed on or under the electrodes 691 and 770.

A first alignment layer 511 may be disposed to cover the passivation layer 680, the pixel electrodes 691, and the overpasses 583, and a second alignment layer 521 may be disposed to cover the common electrode 770. The first and second alignment layers 511 and 521 may correspond to a vertical alignment layer. The liquid crystal layer 503 may be disposed between the first and second alignment layers 511 and 521.

In yet still another exemplary embodiment, the LCD apparatus may further include a phase retardation layer to compensate a phase delay of the liquid crystal layer 503.

The liquid crystal layer 503 may have negative dielectric anisotropy as described above, and the liquid crystals 810 in the liquid crystal layer 503 may be arranged perpendicular to the electrodes 691 and 770 without any electric field. In this case, the polarizing layers 512 and 522 may block incident light irradiating onto the bottom surface of the substrate 610. In other words, the incident light may not pass through the polarizing layers 512 and 522.

As described above, the liquid crystal layer 503 may include a plurality of liquid crystals 810, and each liquid crystal 810 may contain a positive compound material, a negative compound material, and a neutral compound layer. A neutral compound content of the liquid crystal 810 may be within a range of about 40 wt % to about 50 wt %, and a negative compound content of the liquid crystal 810 may be within a range of about 50 wt % to about 65 wt %.

According to the exemplary embodiments describe above, the liquid crystal 810 may include both the positive compound material and the negative compound material, thereby increasing a total dielectric constant of the liquid crystal layer 503 including the plurality of liquid crystals 810. Thus, the liquid crystal capacitances may also increase. This may lead to an increase in the data voltage holding time of the LCD apparatus. Accordingly, there may be no need to form an auxiliary capacitor to increase the liquid crystal capacitances in the pixel areas PA. As a result, the aperture ratio of the LCD apparatus may be increased without any degradation of the integrated density.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal, comprising:
about 50 wt % to about 65 wt % of a negative compound material having a dielectric anisotropy of a negative polarity, the negative compound material including compounds represented by each of the following chemical formula 2, 3 and 4; and
about 40 wt % to about 50 wt % of a neutral compound material including a compound represented by each of the following chemical formulas 5 and 7;

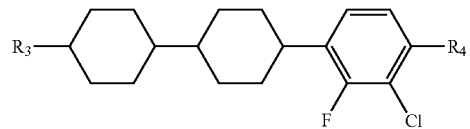
Chemical Formula 2

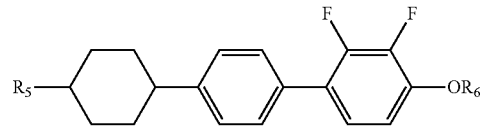
Chemical Formula 3

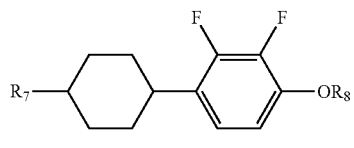
Chemical Formula 4

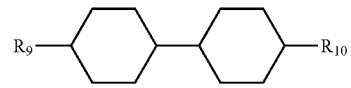
Chemical Formula 5

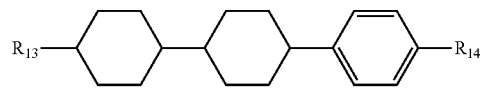
Chemical Formula 7 wherein, "$R_3$", "$R_4$", "$R_5$", "$R_6$", "$R_7$", "$R_8$", "$R_9$", "$R_{10}$", "$R_{13}$" and "$R_{14}$" is one of an alkyl group, an alkenyl group and an alkoxy group.

2. The liquid crystal of claim 1, further comprising a positive compound material is about 2 wt % to about 15 wt %.

3. The liquid crystal of claim 2, wherein the neutral compound material further comprises at least one compound expressed by the following chemical formula:

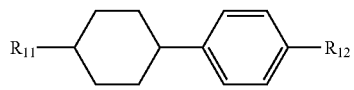
Chemical Formula 6 wherein "$R_{11}$" and "$R_{12}$" are one of an alkyl group, an alkenyl group and an alkoxy group.

4. The liquid crystal of claim 3, wherein a content of the compound expressed by chemical formula 2 is about 5 wt % to about 15 wt %, wherein a content of the compound expressed by chemical formula 3 is about 18 wt % to about 25 wt %, and wherein a content of the compound expressed by chemical formula 4 is about 20 wt % to about 25 wt %.

5. The liquid crystal of claim 4, wherein a content of the compound expressed by chemical formula 5 is about 25 wt % to about 30 wt %, wherein a content of the compound expressed by chemical formula 6 is less than about 10 wt %, and wherein a content of the compound expressed by chemical formula 7 is about 12 wt % to about 19 wt %.

6. A liquid crystal display apparatus, comprising:
a first substrate having a pixel area;
a second substrate facing the first substrate; and
a plurality of liquid crystals disposed between the first substrate and the second substrate, wherein each liquid crystal comprises:
about 50 wt % to about 65 wt % of a negative compound material having a dielectric anisotropy of a negative polarity, the negative compound material including compounds represented by each of the following chemical formula 2, 3 and 4; and about 40 wt % to about 50 wt % of a neutral compound material including a compound represented by each of the following chemical formulas 5 and 7;

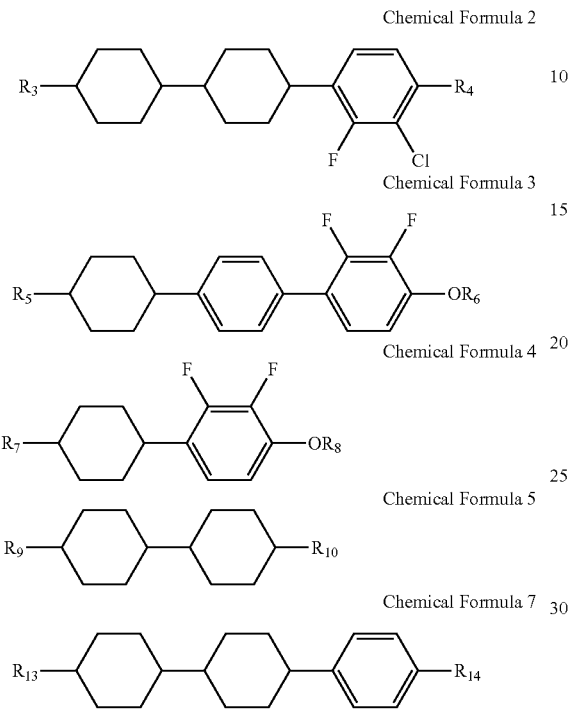

Chemical Formula 2

Chemical Formula 3

Chemical Formula 4

Chemical Formula 5

Chemical Formula 7 wherein, "$R_3$", "$R_4$", "$R_5$", "$R_6$", "$R_7$", "$R_8$", "$R_9$", "$R_{10}$", "$R_{13}$" and "$R_{14}$" is one of an alkyl group, an alkenyl group and an alkoxy group.

7. The apparatus of claim 6, further comprising a positive compound material is about 2 wt % to about 15 wt %.

8. The apparatus of claim 6, wherein the neutral compound material further comprises at least one compound expressed by the following chemical formula 6:

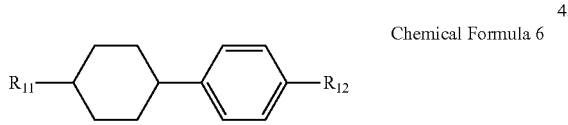

Chemical Formula 6 wherein, "$R_{11}$" and "$R_{12}$" are one of an alkyl group, an alkenyl group and an alkoxy group.

9. The apparatus of claim 8, wherein a content of the compound expressed by chemical formula 2 is about 5 wt % to about 15 wt %, wherein a content of the compound expressed by chemical formula 3 is about 18 wt % to about 25 wt %, and wherein a content of the compound expressed by chemical formula 4 is about 20 wt % to about 25 wt %.

10. The apparatus of claim 9, wherein a content of the compound expressed by chemical formula 5 is about 25 wt % to about 30 wt %, wherein a content of the compound expressed by chemical formula 6 is less than about 10 wt %, and wherein a content of the compound expressed by chemical formula 7 is about 12 wt % to about 19 wt %.

11. The apparatus of claim 10, wherein a dielectric anisotropy of the liquid crystal is within a range of about −2.9 to −3.4.

12. The apparatus of claim 10, wherein the liquid crystal has a phase transition temperature of about 74° C. to about 81° C. and a diffractive anisotropy of about 0.1 or the less.

13. The apparatus of claim 10, further comprising:
a gate line disposed on the first substrate;
a data line disposed across the gate line to define the pixel area at a crossing of the gate line and the data line;
a pixel electrode to receive a data voltage corresponding to an image of the pixel area, the pixel electrode being disposed in the pixel area; and
a common electrode to receive a common voltage, the common electrode being disposed on the second substrate,
wherein the pixel electrode overlaps at least one of the gate line and the data line, and
wherein a frame frequency of the image is about 120 Hz.

14. The apparatus of claim 13, further comprising:
a first domain divider arranged at the pixel electrode; and
a second domain divider arranged at the common electrode and spaced apart from the first domain divider, the first domain divider and the second domain divider dividing the pixel area into a plurality of domains,
wherein the pixel electrode comprises a first pixel electrode and a second pixel electrode having a smaller area than the first pixel electrode, wherein the first pixel electrode overlaps at least one of the gate line and the data line, and wherein a first data voltage and a second data voltage, which are different from each other, are applied to the first pixel electrode and the second pixel electrode, respectively.

* * * * *